(12) United States Patent
Chen (10) Patent No.: US 12,009,735 B2
(45) Date of Patent: Jun. 11, 2024

(54) SYNCHRONOUS RECTIFIER CONTROLLER AND CONTROL METHOD USED FOR ADJUSTING A VOLTAGE OF A CONTROL TERMINAL OF A RECTIFIER SWITCH

(71) Applicant: Ark Semiconductor Corp. Ltd., Shenzhen (CN)

(72) Inventor: Shih-Wei Chen, Taipei (TW)

(73) Assignee: ARK MICROELECTRONIC CORP. LTD.

( * ) Notice: Subject to any disclaimer, the term of this patent is extended or adjusted under 35 U.S.C. 154(b) by 232 days.

(21) Appl. No.: 17/853,948

(22) Filed: Jun. 30, 2022

(65) Prior Publication Data
US 2023/0021333 A1 Jan. 26, 2023

(30) Foreign Application Priority Data
Jul. 21, 2021 (CN) .......................... 202110825305.6

(51) Int. Cl.
*H02M 1/08* (2006.01)
*H02M 7/217* (2006.01)
*H02M 3/335* (2006.01)

(52) U.S. Cl.
CPC ............. *H02M 1/08* (2013.01); *H02M 7/217* (2013.01); *H02M 3/33592* (2013.01)

(58) Field of Classification Search
CPC .... H02M 1/08; H02M 7/217; H02M 3/33592; H02M 3/33569; H02M 3/335
See application file for complete search history.

(56) References Cited

U.S. PATENT DOCUMENTS

| | | | |
|---|---|---|---|
| 9,270,176 B1 | 2/2016 | Nguyen | |
| 10,079,549 B1 | 9/2018 | Chu | |
| 11,489,451 B1 * | 11/2022 | Liu | H02M 3/33592 |
| 11,532,992 B2 * | 12/2022 | Shen | H02M 3/33592 |
| 11,764,697 B2 * | 9/2023 | Zhao | H02M 3/33592 |
| | | | 363/21.14 |
| 2016/0233779 A1 | 8/2016 | Cohen | |

(Continued)

FOREIGN PATENT DOCUMENTS

| | | |
|---|---|---|
| CN | 101621876 A | 1/2010 |
| CN | 103795234 A | 5/2014 |

(Continued)

*Primary Examiner* — Adolf D Berhane
(74) *Attorney, Agent, or Firm* — Winston Hsu (57) ABSTRACT

The synchronous rectifier controller includes a voltage regulator to provide a control voltage to the control terminal of the rectifier switch. The synchronous rectifier controller compares the channel voltage of the rectifier switch with a threshold voltage to generate a comparison result signal. When the channel voltage is greater than the threshold voltage, the comparison result signal has a first logic value, and when the channel voltage is less than the threshold voltage, the comparison result signal has a second logic value. An inverted comparison result signal is generated according to the comparison result signal. When the channel voltage is less than the threshold voltage, the inverted comparison result signal enables a pull-up power supply to pull up the control voltage; and when the channel voltage is greater than the threshold voltage, the comparison result signal enables a pull-down power supply to pull down the control voltage.

20 Claims, 8 Drawing Sheets

(56) References Cited

U.S. PATENT DOCUMENTS

| | | |
|---|---|---|
| 2017/0047855 A1 | 2/2017 | Yang |
| 2019/0238129 A1 | 8/2019 | Fukushima |
| 2019/0393794 A1 | 12/2019 | Feng |
| 2020/0036293 A1* | 1/2020 | Kannan ............. H02M 3/33523 |
| 2021/0091675 A1 | 3/2021 | Rajesh |

FOREIGN PATENT DOCUMENTS

| | | |
|---|---|---|
| CN | 105262329 A | 1/2016 |
| CN | 106452124 A | 2/2017 |
| CN | 109510481 A | 3/2019 |
| CN | 109980946 A | 7/2019 |
| CN | 110071639 A | 7/2019 |
| CN | 107508473 B | 8/2019 |
| CN | 110896283 A | 3/2020 |
| CN | 111010039 A | 4/2020 |
| CN | 111193407 A | 5/2020 |
| CN | 111786560 A | 10/2020 |
| TW | 201902105 A | 1/2019 |

\* cited by examiner

SYNCHRONOUS RECTIFIER CONTROLLER AND CONTROL METHOD USED FOR ADJUSTING A VOLTAGE OF A CONTROL TERMINAL OF A RECTIFIER SWITCH

BACKGROUND OF THE INVENTION

1. Field of the Invention

The invention is related to a synchronous rectifier controller and a control method, and more particularly, a synchronous rectifier controller and a control method used for adjusting a voltage of a control terminal of a rectifier switch.

2. Description of the Prior Art

In the structure of a power conversion drive controller, such as a flyback circuit, a diode can be used as a rectifier component. For example, a Schottky diode can be used because of its low forward-bias voltage drop. However, for example, if the voltage across the diode is 0.5 volts and the root mean square (RMS) value of the current across the diode is 10 amps, since the power loss is equal to the product of the current and the voltage across the diode, a power loss of about 5 watts is expected.

For reducing this power loss, a transistor can be used to replace the diode. For example, the anode and the cathode of the diode can be replaced by two terminals (e.g., a drain terminal and a source terminal) of a metal-oxide-semiconductor field-effect transistor (MOSFET), thereby replacing the diode with the transistor. After the replacement, assuming that the impedance of the transistor is 10 milliohms (me) when the transistor is turned on, and the current across the transistor is still 10 amps, the power loss is equal to the product of the impedance and the square of the current, and the power loss will be 1 watt. The above figures are only used as an example. In this example, since the power loss is reduced from 5 watts to 1 watt, it can be seen that using a transistor instead of a diode to form the rectifier component of the power conversion drive controller can reduce the power loss.

The above-mentioned rectifier component formed with transistor can be installed on the secondary side of a converter. If the transistor continues to be fully turned on, when the current of the secondary side drops to be a small current, the on-voltage on the transistor will also decrease to be a low voltage, so it is difficult to determine when the rectifier component on the secondary side should be turned off. As a result, the rectifier component will be turned off too early, thereby reducing the operation performance.

SUMMARY OF THE INVENTION

An embodiment provides a synchronous rectifier controller for controlling a rectifier switch. The rectifier switch includes a control terminal, and the synchronous rectifier controller includes a voltage regulator. The voltage regulator includes an output terminal used to provide a control voltage to the control terminal of the rectifier switch. The voltage regulator further includes a comparator, an inverter, a pull-up power supply and a pull-down power supply. The comparator is used to receive a channel voltage of the rectifier switch and compare the channel voltage with a threshold voltage to output a comparison result signal, where the comparison result signal has a first logic value when the channel voltage is higher than the threshold voltage, and the comparison result signal has a second logic value different from the first logic value when the channel voltage is lower than the threshold voltage. The inverter is used to receive the comparison result signal and invert the comparison result signal to generate an inverted comparison result signal complementary to the comparison result signal. The pull-up power supply is coupled to the output terminal of the voltage regulator and used to be enabled by the inverted comparison result signal to pull up the control voltage when the channel voltage is lower than the threshold voltage. The pull-down power supply is coupled to the output terminal of the voltage regulator and is used to be enabled by the comparison result signal to pull down the control voltage when the channel voltage is higher than the threshold voltage. The pull-up power supply and the pull-down power supply are not enabled at the same time.

Another embodiment provides a synchronous rectifier controller for controlling a rectifier switch. The rectifier switch includes a control terminal. The synchronous rectifier controller includes a voltage regulator. The voltage regulator includes an output terminal used to provide a control voltage to the control terminal of the rectifier switch. The voltage regulator further includes a comparator, a first inverter, a waveform slope detection circuit, a second inverter, a main pull-up power supply, a main pull-down power supply, an auxiliary pull-up power supply and an auxiliary pull-down power supply. The comparator is used to receive a channel voltage of the rectifier switch and compare the channel voltage with a threshold voltage to output a comparison result signal, where the comparison result signal has a first logic value when the channel voltage is higher than the threshold voltage, and the comparison result signal has a second logic value different from the first logic value when the channel voltage is lower than the threshold voltage. The first inverter is used to receive the comparison result signal and invert the comparison result signal to generate an inverted comparison result signal complementary to the comparison result signal. The waveform slope detection circuit is used to receive the channel voltage of the rectifier switch, and generate a waveform slope signal accordingly, where the waveform slope signal has a third logic value when a waveform of the channel voltage is rising, and the waveform slope signal has a fourth logic value when the waveform of the channel voltage is falling. The second inverter is used to receive the waveform slope signal and invert the waveform slope signal to generate an inverted waveform slope signal complementary to the waveform slope signal. The main pull-up power supply is coupled to the output terminal of the voltage regulator and configured to pull up the control voltage. The main pull-down power supply is coupled to the output terminal of the voltage regulator and configured to pull down the control voltage. The auxiliary pull-up power supply is coupled to the output terminal of the voltage regulator and configured to simultaneously pull up the control voltage with the main pull-up power supply. The auxiliary pull-down power supply is coupled to the output terminal of the voltage regulator and configured to simultaneously pull down the control voltage with the main pull-down power supply. One of the comparison result signal and the inverted comparison result signal is used to enable the main pull-up power supply, the other one of the comparison result signal and the inverted comparison result signal is used to enable the main pull-down power supply, one of the waveform slope signal and the inverted waveform slope signal is used to enable the auxiliary pull-up power supply, and the other one of the waveform slope signal and the inverted waveform slope signal is used to enable the auxiliary pull-down power supply.

Another embodiment provides a control method of a synchronous rectifier controller. The synchronous rectifier controller includes a voltage regulator. The voltage regulator provides a control voltage to a control terminal of a rectifier switch to control the rectifier switch. The control method includes comparing a channel voltage of the rectifier switch and a threshold voltage to output a comparison result signal, wherein the comparison result signal has a first logic value when the channel voltage is higher than the threshold voltage, and the comparison result signal has a second logic value different from the first logic value when the channel voltage is lower than the threshold voltage; generating an inverted comparison result signal according to the comparison result signal, wherein the inverted comparison result signal is complementary to the comparison result signal; enabling a pull-up power supply by using the inverted comparison result signal to pull up the control voltage when the channel voltage is lower than the threshold voltage; and enabling a pull-down power supply by using the comparison result signal to pull down the control voltage when the channel voltage is higher than the threshold voltage.

Another embodiment provides a control method of a synchronous rectifier controller. The synchronous rectifier controller provides a voltage regulator. The voltage regulator provides a control voltage through an output terminal. The control voltage is provided to a control terminal of a rectifier switch to control the rectifier switch. The control method includes comparing a channel voltage of the rectifier switch and a threshold voltage to output a comparison result signal, wherein the comparison result signal has a first logic value when the channel voltage is higher than the threshold voltage, and the comparison result signal has a second logic value different from the first logic value when the channel voltage is lower than the threshold voltage; generating an inverted comparison result signal according to the comparison result signal, wherein the inverted comparison result signal is complementary to the comparison result signal; outputting a waveform slope signal according to the channel voltage of the rectifier switch, wherein the waveform slope signal has a third logic value when a waveform of the channel voltage is rising, and the waveform slope signal has a fourth logic value when the waveform of the channel voltage is falling; generating an inverted waveform slope signal according to the waveform slope signal, wherein the inverted waveform slope signal is complementary to the waveform slope signal; selectively enabling a main pull-up power supply by using one of the comparison result signal and the inverted comparison result signal to pull up the control voltage, and selectively enabling a main pull-down power supply by using the other one of the comparison result signal and the inverted comparison result signal to pull down the control voltage; and selectively enabling an auxiliary pull-up power supply by using one of the waveform slope signal and the inverted waveform slope signal to simultaneously pull up the control voltage with the main pull-up power supply, and selectively enabling an auxiliary pull-down power supply by using the other one of the waveform slope signal and the inverted waveform slope signal to simultaneously pull down the control voltage with the main pull-down power supply.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
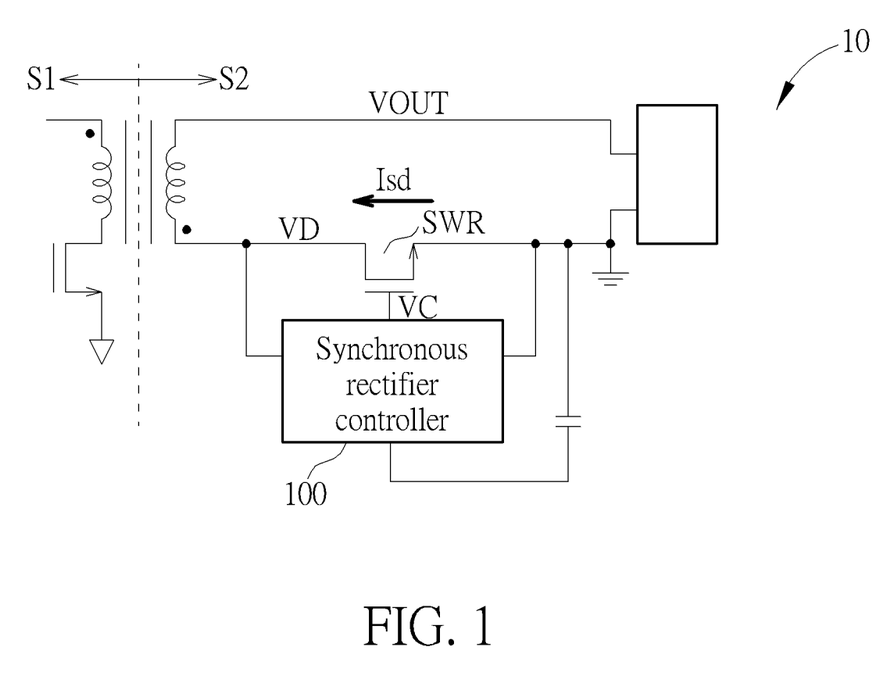
FIG. 1 illustrates a synchronous rectifier controller embedded in a voltage converter according to an embodiment.

FIG. 1 illustrates a synchronous rectifier controller 100 embedded in a voltage converter 10 according to an embodiment. As shown in FIG. 1, the voltage converter 10 can include a primary side S1 and a secondary side S2. The synchronous rectifier controller 100 can be used for controlling a rectifier switch SWR disposed at the secondary side S2. The synchronous rectifier controller 100 can provide a voltage VC to the control terminal of the rectifier switch SWR to control the level of turning on or turning off the rectifier switch SWR. The current Isd can flow through the rectifier switch SWR from the source terminal to the drain terminal. After converting an inputted voltage, the voltage converter 10 can output the voltage VOUT at the secondary side S2.

Figure 2:
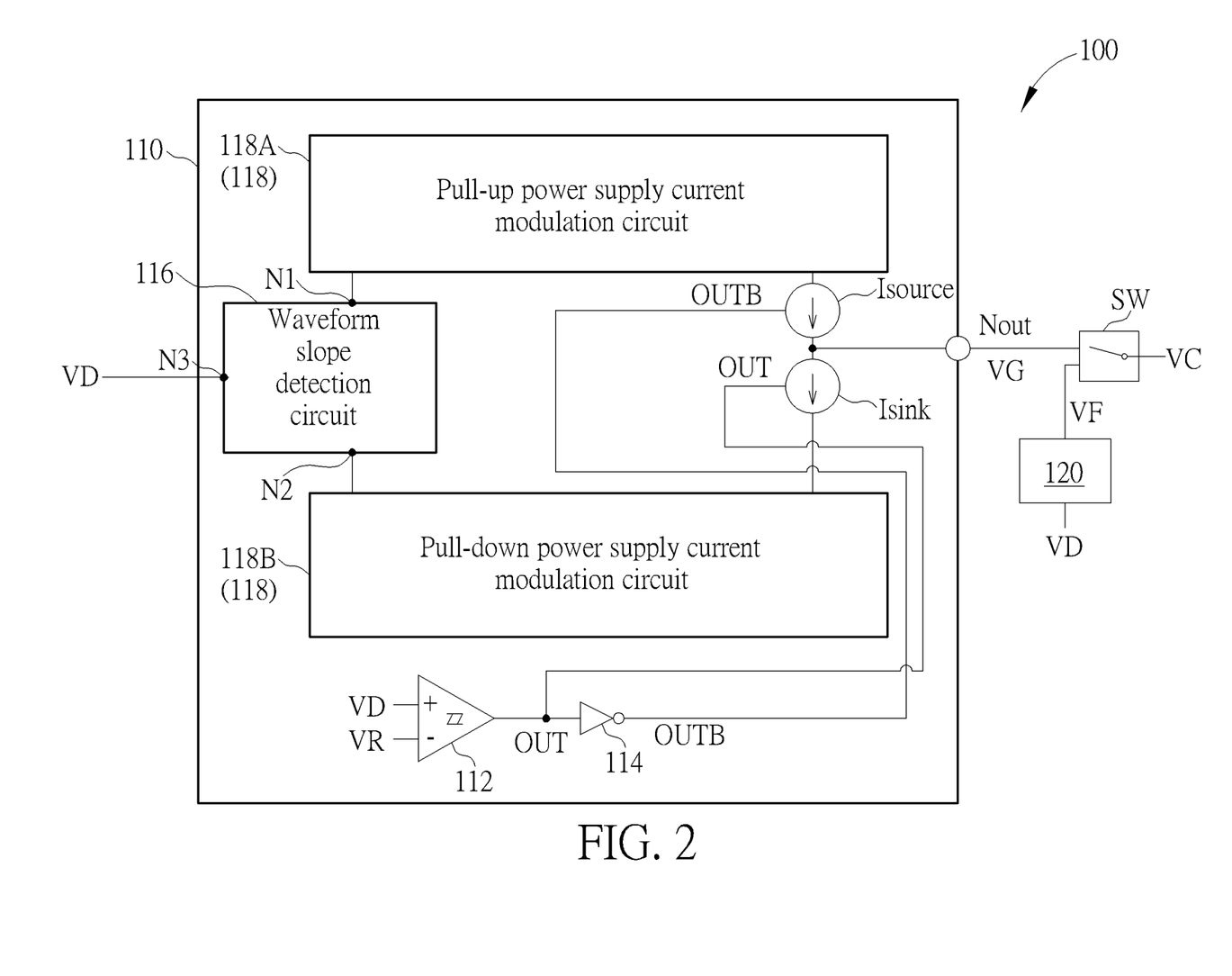
FIG. 2 illustrates the synchronous rectifier controller according to an embodiment.

FIG. 2 illustrates the synchronous rectifier controller 100 according to an embodiment. The synchronous rectifier controller 100 includes a voltage regulator 110. The voltage regulator 110 includes an output terminal Nout used to provide a control voltage VG. Optionally, the control voltage VG can be the voltage VC and be transmitted to the control terminal of the rectifier switch SWR for controlling the rectifier switch SW. The voltage regulator 110 can include a comparator 112, a pull-up power supply Isource and a pull-down power supply Isink.

The comparator 112 can receive a channel voltage VD of the rectifier switch SWR and compare the channel voltage VD with a threshold voltage VR to output a comparison result signal OUT. The comparison result signal OUT can have a first logic value (e.g., 1) when the channel voltage VD is higher than the threshold voltage VR. The comparison result signal OUT can have a second logic value (e.g., 0) different from the first logic value when the channel voltage VD is lower than the threshold voltage VR.

The inverter 114 can receive the comparison result signal OUT and invert the comparison result signal OUT to generate an inverted comparison result signal OUTB. The inverted comparison result signal OUTB is complementary to the comparison result signal OUT.

The pull-up power supply Isource can be coupled to the output terminal Nout of the voltage regulator 110 and be enabled by the inverted comparison result signal OUTB. When the channel voltage VD is lower than the threshold voltage VR, the pull-up power supply Isource can be enabled to pull up the control voltage VG.

The pull-down power supply Isink can be coupled to the output terminal Nout of the voltage regulator 110 and be enabled by the comparison result signal OUT. When the channel voltage VD is higher than the threshold voltage VR, the pull-down power supply Isink can be enabled to pull down the control voltage VG.

Since the pull-up power supply Isource and the pull-down power supply Isink are enabled by the inverted comparison result signal OUTB and the comparison result signal OUT respectively, the pull-up power supply Isource and the pull-down power supply Isink are enabled at the same time.

Regarding the operation of the comparator 112, there is a delay time TD. The comparator 112 can compare the channel voltage VD with the threshold voltage VR, and output the comparison result signal OUT after the delay time TD. When the channel voltage VD is lower than the threshold voltage VR, the pull-up power supply Isource can be enabled to pull up the control voltage VG after the delay time TD. When the channel voltage VD is higher than the threshold voltage VR, the pull-down power supply Isink is enabled to pull down the control voltage VG after the delay time TD. The delay time TD is further described below in the waveform diagram of FIG. 4.

For example, if the rectifier switch SWR of FIG. 1 is formed with an MOSFET, the channel voltage VD can be the drain voltage of the MOSFET, and the voltage VC can be the gate voltage of the MOSFET.

As shown in FIG. 2, the synchronous rectifier controller 100 can further include a fully-on controller 120 and a multiplexer SW. The fully-on controller 120 can receive the channel voltage VD of the rectifier switch SWR. When the channel voltage VD meets a predetermined condition (e.g., the channel voltage VD is lower than a predetermined turning-on threshold voltage), the fully-on controller 120 can control the multiplexer SW to provide a fully-on voltage VF to the control terminal of the rectifier switch SWR, and the rectifier switch SWR can be in a fully-on mode and be completely turned on. In another scenario, when the multiplexer SW outputs the control voltage VG provided by the voltage regulator 110 to the control terminal of the rectifier switch SWR, the rectifier switch SWR can be in a voltage regulation mode and be partially turned on. Hence, the multiplexer SW can be controlled and switched to make the control terminal of the rectifier switch SWR to selectively receive one of the fully-on voltage VF and the control voltage VG. In other words, the multiplexer SW can be a switch for determining the voltage VC to be one of the fully-on voltage VF and the control voltage VG.

As shown in FIG. 2, the voltage regulator 110 of the synchronous rectifier controller 100 can further include a waveform slope detection circuit 116 and a power supply current modulation circuit 118. The power supply current modulation circuit 118 can include a pull-up power supply current modulation circuit 118A and a pull-down power supply current modulation circuit 118B. The waveform slope detection circuit 116 can receive the channel voltage VD of the rectifier switch SWR to generate a waveform change slope value of the channel voltage VD. The power supply current modulation circuit 118 can be controlled according to the waveform change slope value. When the waveform change slope value is corresponding to a smaller slope change (e.g., the absolute value of the waveform change slope value is smaller), the pull-up power supply Isource and the pull-down power supply Isink can output higher currents to the output terminal Nout. When the waveform change slope value is corresponding to a larger slope change (e.g., the absolute value of the waveform change slope value is larger), the pull-up power supply Isource and the pull-down power supply Isink can output lower currents to the output terminal Nout, where the higher currents are greater than the lower currents.

Figure 3:
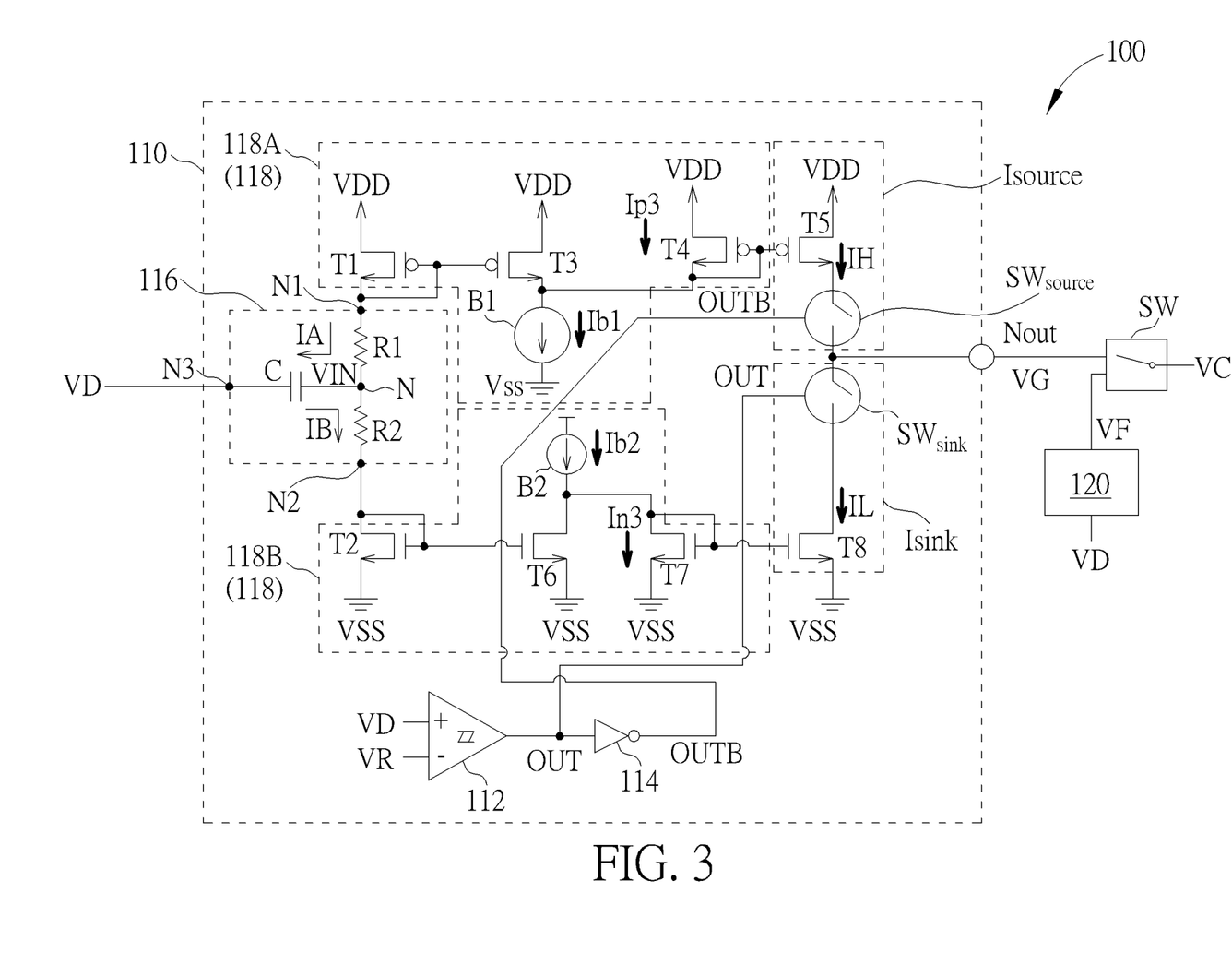
FIG. 3 illustrates the synchronous rectifier controller of FIG. 1 and FIG. 2.
Figure 4:
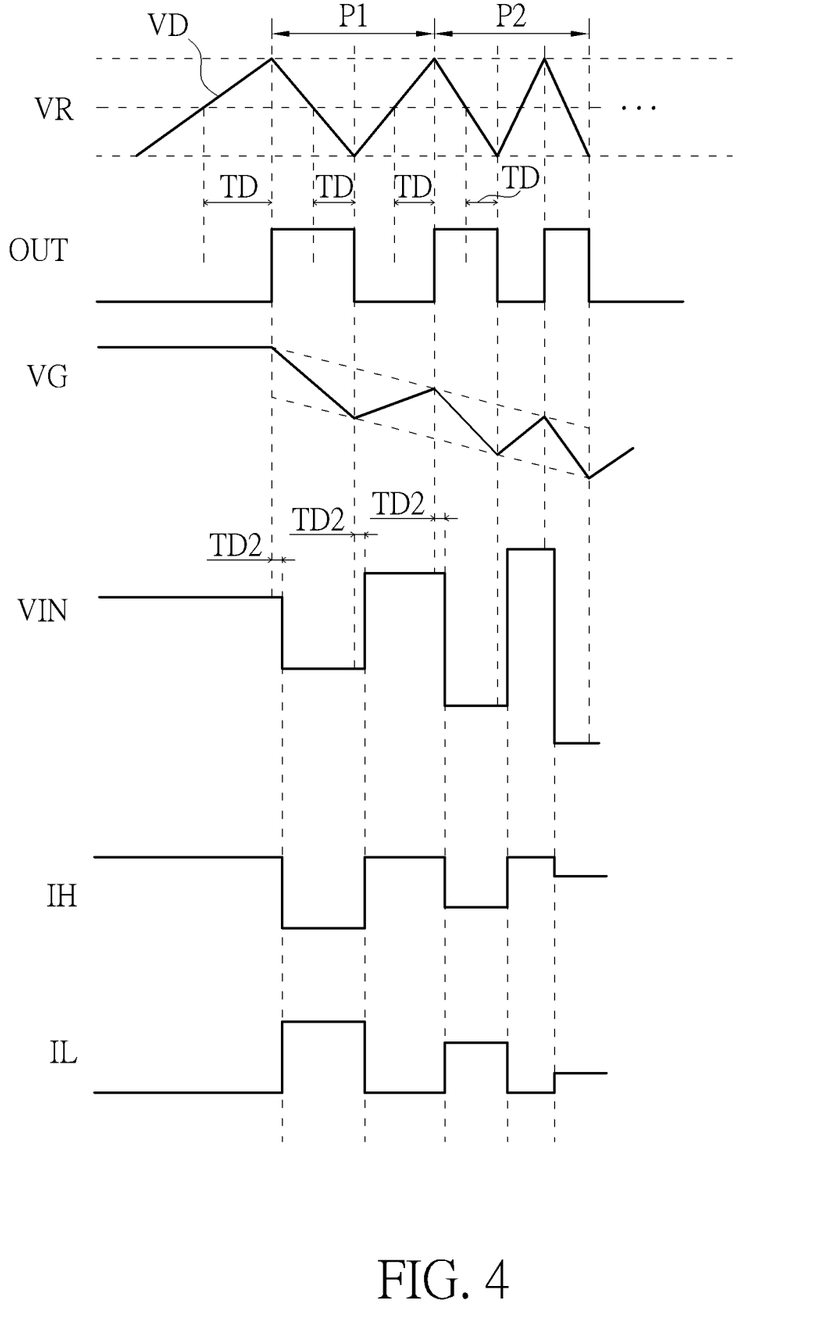
FIG. 4 illustrates waveforms of the currents and voltages of FIG. 3.

FIG. 3 illustrates the synchronous rectifier controller 100 of FIG. 1 and FIG. 2. FIG. 3 includes more details. FIG. 4 illustrates waveforms of the currents and voltages of FIG. 3.

As shown in FIG. 3, the waveform slope detection circuit 116 can include a first resistor R1, a second resistor R2 and a capacitor C. The first resistor R1 can be coupled between a first terminal N1 of the waveform slope detection circuit 116 and a node N. The second resistor R2 can be coupled between a second terminal N2 of the waveform slope detection circuit 116 and the node N. The capacitor C can be coupled between a third terminal N3 of the waveform slope detection circuit 116 and the node N. The third terminal N3 of the waveform slope detection circuit 116 can receive the channel voltage VD.

As shown in FIG. 4, when the channel voltage VD rises to the threshold voltage VR, the voltage regulator 110 can start to adjust the control voltage VG to make the rectifier switch SWR leave the fully-on mode and enter the voltage regulation mode. When the control voltage VG decreases, the resistance of the rectifier switch SWR can increase. As a result, the channel voltage VD is prevented from being overly low, so the channel voltage VD will not be easily pulled up by noise and rise above a turning-off threshold voltage. Therefore, mistakenly turning off the rectifier switch SWR can be avoided, increasing the overall power conversion efficiency.

When a changing rate (i.e. variation per unit of time) of the channel voltage VD increases, an absolute value of a voltage VIN of the node N can increase. The voltage VIN is generated by being filtered by the capacitor C. The voltage VIN of the node N is corresponding to the waveform change slope value of the channel voltage VD. For example, as shown in FIG. 4, when the changing rate of the channel voltage VD is smaller (i.e., the variation of the channel voltage VD per unit of time is smaller, no matter the variation is positive or negative), the absolute value of the voltage VIN can be smaller. When the changing rate of the channel voltage VD is larger (i.e., the variation of the channel voltage VD per unit of time is larger, no matter the variation is positive or negative), the absolute value of the voltage VIN can be larger. In FIG. 4, a delay time TD2 can be the delay between the channel voltage VD and the voltage VIN. For example, after the delay time TD2 upon the channel voltage VD changes from a rising waveform with a positive slope to a falling waveform with a negative slope, the voltage VIN can change accordingly. For example, the waveform slope detection circuit 116 can be a high pass filter.

As shown in FIG. 3, the power supply current modulation circuit 118 can include a first transistor T1 to a fourth transistor T4, a sixth transistor T6, a seventh transistor T7, a first current source B1 and a second current source B2. The power supply current modulation circuit 118 can be coupled to the pull-up power supply Isource and the pull-down power supply Isink. The pull-up power supply Isource can include a fifth transistor T5 and a switch $SW_{source}$. The pull-down power supply Isink can include an eighth transistor T8 and a switch $SW_{sink}$.

Each of the first transistor T1 to the eighth transistor T8 can include a first terminal, a second terminal and a control terminal. For example, each of the transistors T1, T3, T4 and T5 can be of p-type, and its first terminal, second terminal and control terminal can be a source terminal, a drain terminal and a gate terminal respectively. Each of the transistors T2, T6, T7 and T8 can be of n-type, and its first terminal, second terminal and control terminal can be a drain terminal, a source terminal and a gate terminal respectively.

Regarding the first transistor T1, the first terminal can be coupled to a first reference voltage terminal VDD, the second terminal can be coupled to the first terminal N1 of the waveform slope detection circuit 116, and the control terminal can be coupled to the second terminal of the transistor T1. The second terminal of the first transistor T1 can output a first current IA to the first terminal N1 of the waveform slope detection circuit 116.

Regarding the second transistor T2, the first terminal can be coupled to the second terminal N2 of the waveform slope detection circuit 116, the second terminal can be coupled to a second reference voltage terminal VSS, and the control terminal can be coupled to the first terminal of the second transistor T2. The first terminal of the second transistor T2 can receive a second current D3 from the second terminal N2 of the waveform slope detection circuit 116. The second reference voltage terminal VSS can be a ground terminal or provide a negative voltage.

Regarding the third transistor T3, the first terminal can be coupled to the first reference voltage terminal VDD, and the control terminal can be coupled to the control terminal of the first transistor T1.

The first current source B1 can be coupled between the second terminal of the third transistor T3 and the second reference voltage terminal VSS, and can be used to provide a first reference current Ib1.

Regarding the fourth transistor T4, the first terminal can be coupled to the first reference voltage terminal VDD, the second terminal can be coupled to the second terminal of the third transistor T3, and the control terminal can be coupled to the second terminal of the fourth transistor T4. A third current Ip3 can flow through the first terminal of the fourth transistor T4.

The second current source B2 can be used to provide a second reference current Ib2. Regarding the sixth transistor T6, the first terminal can be coupled to the second current source B2, the second terminal can be coupled to the second reference voltage terminal VSS, and the control terminal can be coupled to the control terminal of the second transistor T2.

Regarding the seventh transistor T7, the first terminal can be coupled to the first terminal of the sixth transistor T6, the second terminal can be coupled to the second reference voltage terminal VSS, and the control terminal can be coupled to the first terminal of the seventh transistor T7. A fifth current In3 can flow through the seventh transistor T7.

As shown in FIG. 3, when the inverted comparison result signal OUTB has an enabling signal level, the switch $SW_{source}$ of the pull-up power supply Isource can be turned on, and a fourth current IH can flow to pull up the control voltage VG. When the comparison result signal OUT has an enabling signal level, the switch $SW_{sink}$ of the pull-down power supply Isink can be turned on, and a sixth current IL can flow to pull down the control voltage VG.

In the pull-up power supply Isource, regarding the fifth transistor T5, the first terminal can be coupled to the first reference voltage terminal VDD, the second terminal can be coupled to the switch $SW_{source}$, and the control terminal can be coupled to the control terminal of the fourth transistor T4. The fourth current IH can flow through the fifth transistor T5 to the switch $SW_{source}$. The fourth current IH can be a source current for pulling up the control voltage VG.

The third current Ip3 can be positively related to a difference between the first reference current Ib1 and the first current IA. It can be expressed as Ip3 ∝(Ib1−IA). For example, it can be Ip3=(Ib1−IA).

The third current Ip3 can be positively related to the fourth current IH. It can be expressed as IH ∝Ip3. For example, IH=n1×Ip3. The ratio of the size of the fourth transistor T4 to the size of the fifth transistor T5 can be 1 to n1 (i.e. 1:n1).

Regarding the eighth transistor T8 of the pull-down power supply Isink, the first terminal can be coupled to the switch $SW_{sink}$, the second terminal can be coupled to the second reference voltage terminal VSS, and the control terminal can be coupled to the control terminal of the seventh transistor T7. The sixth current IL can flow through the eighth transistor T8. The sixth current IL can be a sink current for pulling down the control voltage VG.

The fifth current In3 can be positively related to a difference between the second reference current Ib2 and the second current IB. It can be expressed as In3 ∝(Ib2−IB). For example, it can be In3=Ib2−D3.

The sixth current IL can be positively related to the fifth current In3. It can be expressed as IL=n2×In3. The ratio of the size of the seventh transistor T7 to the size of the eighth transistor T8 can be 1 to n1 (i.e. 1:n1).

As shown by the waveforms of FIG. 4, when the rectifier switch SWR is in the voltage regulation mode, the changing rate (i.e. variation per unit of time) of the channel voltage VD can gradually increase, and the range of the variation of the control voltage VG can gradually decrease. Hence, the waveform slope of the channel voltage VD in a period P2 can be greater than the waveform slope of the channel voltage VD in a period P1, where the period P2 can follow the period P1. The range of the variation of the control voltage VG in the period P2 can be smaller than that in the period P1. As shown by the waveform of the changing control voltage VG, the line connected by the peaks and the line connected by the valleys can have a downward trend. Hence, when regulating the channel voltage VD in the period P1, the voltage regulator 110 can apply a larger regulation voltage to the control voltage VG. In the period P2, the voltage regulator 110 can apply a smaller regulation voltage to the control voltage VG to avoid applying an excessive regulation voltage so as not to mistakenly and excessively pull up the channel voltage VD. As a result, the rectifier switch SWR is not turned off too early, and the conversion efficiency is maintained.

In order to achieve the abovementioned results, when the changing rate of the channel voltage VD increases, and the absolute value of the voltage VIN of the node N increases, the embodiment can make the absolute value of the fourth current IF flowing through the pull-up power supply Isource decrease, and make the absolute value of the sixth current IL flowing through the pull-down power supply Isink decrease. Hence, in the period P1, the fourth current IH and sixth current IL can be larger to adjust the control voltage VG with a higher speed and a larger range. Relatively, in the period P2, the fourth current IH and sixth current IL can be smaller to adjust the control voltage VG with a lower speed and a higher accuracy. By using the regulation voltages of two different magnitudes to adjust the level of turning on the rectifier switch SWR, the time of tuning off the rectifier switch SWR can be accurately controlled without turning off the rectifier switch SWR too early.

Figure 5:
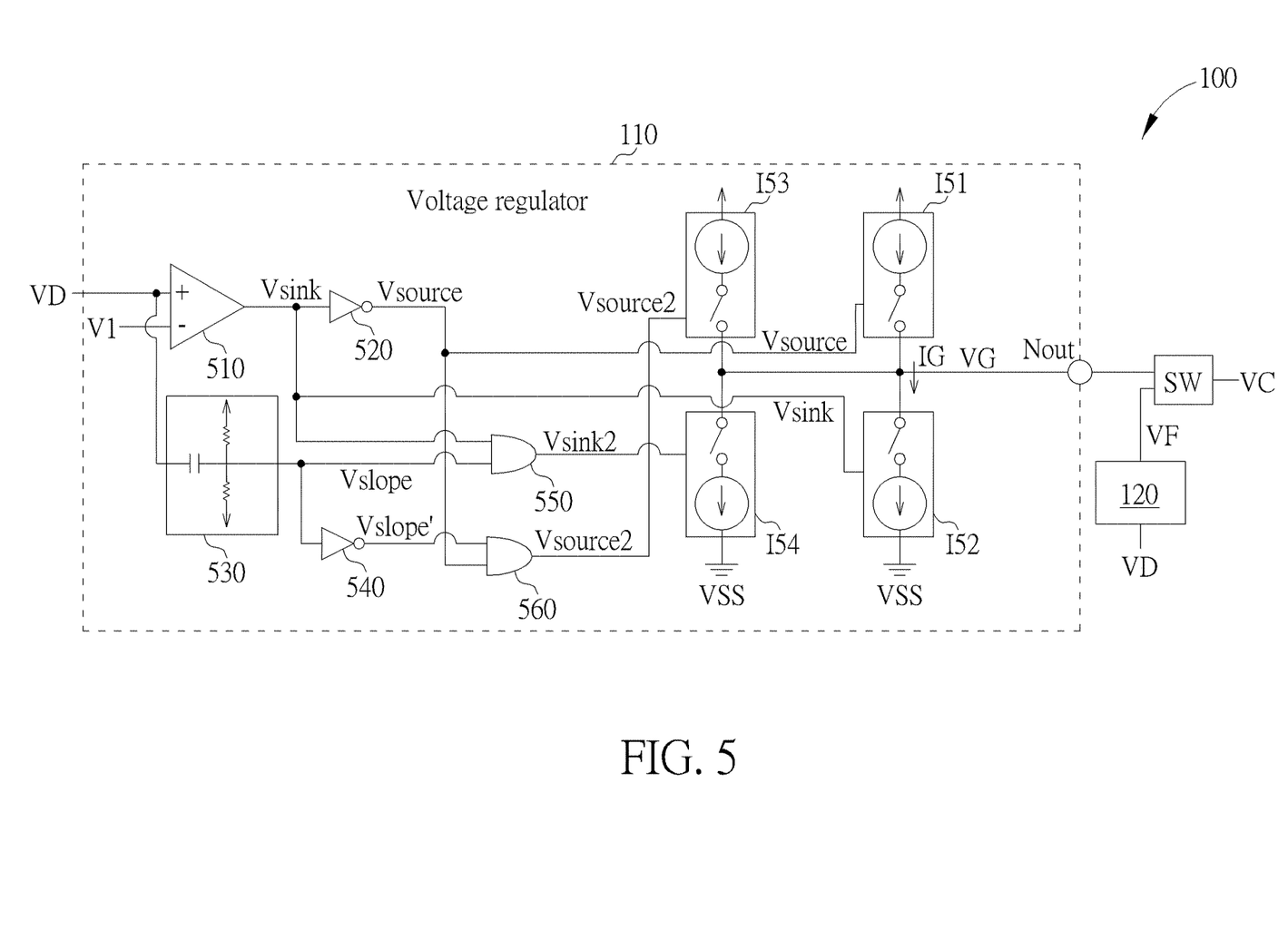
FIG. 5 illustrates the synchronous rectifier controller of FIG. 1 according to another embodiment.

FIG. 5 illustrates the synchronous rectifier controller 100 of FIG. 1 according to another embodiment. The synchronous rectifier controller 100 of FIG. 5 can be used for controlling the rectifier switch SWR shown in FIG. 1. As shown in FIG. 5, the synchronous rectifier controller 100 can include a voltage regulator 110, and the voltage regulator 110 can have an output terminal Nout for providing a control voltage VG to the control terminal of the rectifier switch SWR. The voltage regulator 110 can include a comparator 510, a first inverter 520, a waveform slope detection circuit 530, a second inverter 540, a main pull-up power supply 151, a main pull-down power supply 152, an auxiliary pull-up power supply 153 and an auxiliary pull-down power supply 154.

The comparator 510 can receive the channel voltage VD of the rectifier switch SWR and compare the channel voltage VD with a threshold voltage V1 to generate a comparison result signal Vsink. The comparison result signal Vsink can have a first logic value (e.g., 1) when the channel voltage VD is higher than the threshold voltage V1. The comparison result signal Vsink can have a second logic value (e.g., 0) when the channel voltage VD is lower than the threshold voltage V1.

The first inverter 520 can be used to receive and invert the comparison result signal Vsink to generate an inverted comparison result signal Vsource. The inverted comparison result signal Vsource can be complementary to the comparison result signal Vsink.

The waveform slope detection circuit 530 can receive the channel voltage VD of the rectifier switch SWR, and generate a waveform slope signal Vslope accordingly. The waveform slope signal Vslope can have a third logic value (e.g., a high value) when a waveform of the channel voltage VD is rising, and the waveform slope signal can have a fourth logic value (e.g. a low value) when the waveform of the channel voltage VD is falling. For example, the structure of the waveform slope detection circuit 530 can be like the waveform slope detection circuit 116 of FIG. 3 and have a capacitor and two resistors.

The second inverter 540 can be used to receive and invert the waveform slope signal Vslope to generate an inverted waveform slope signal Vslope'. The inverted waveform slope signal Vslope' can be complementary to the waveform slope signal Vslope.

The main pull-up power supply 151 can be coupled to the output terminal Nout and be enabled by one of the comparison result signal Vsink and the inverted comparison result signal Vsource to pull up the control voltage VG. The main pull-down power supply 152 can be coupled to the output terminal Nout and be enabled by the other one of the comparison result signal Vsink and the inverted comparison result signal Vsource to pull down the control voltage VG.

As shown in the example of FIG. 5, the main pull-up power supply 151 and the main pull-down power supply 152 can be enabled by the inverted comparison result signal Vsource and the comparison result signal Vsink respectively. When the comparison result signal Vsink has an enabling signal level, the main pull-down power supply 152 can be enabled; for example, a switch of the main pull-down power supply 152 can be enabled. When the inverted comparison result signal Vsource has an enabling signal level, the main pull-up power supply 151 can be enabled; for example, a switch of the main pull-up power supply 151 can be enabled.

The auxiliary pull-up power supply 153 can be coupled to the output terminal Nout. One of the waveform slope signal Vslope and the inverted waveform slope signal Vslope' can be used to enable the auxiliary pull-up power supply 153. Hence, the auxiliary pull-up power supply 153 can simultaneously pull up the control voltage VG together with the main pull-up power supply 151. The auxiliary pull-down power supply 154 can be coupled to the output terminal Nout. The other one of the waveform slope signal Vslope and the inverted waveform slope signal Vslope' can be used to enable the auxiliary pull-down power supply 154. Hence, the auxiliary pull-down power supply 154 can simultaneously pull down the control voltage VG together with the main pull-down power supply 152.

For example, in FIG. 5, the auxiliary pull-up power supply 153 and the auxiliary pull-down power supply 154 can be enabled by the signals Vsource2 and Vsink2 respectively. Respectively, the signals Vsource2 and Vsink2 can be related to the inverted waveform slope signal Vslope' and the waveform slope signal Vslope. More detailed logical operations are described in later paragraphs. When the signal Vsink2 has an enabling level, the auxiliary pull-down power supply 154 can be enabled. When the signal Vsource2 has an enabling level, the auxiliary pull-up power supply 153 can be enabled.

As shown in FIG. 5, each of the main pull-up power supply 151, the main pull-down power supply 152, the auxiliary pull-up power supply 153 and the auxiliary pull-down power supply 154 can have a current source and a switch coupled in series. When the switch is turned on, a current can flow through the switch to enable the power supply.

Like FIG. 2, the synchronous rectifier controller 100 of FIG. 5 can include a fully-on controller 120 and a multiplexer SW for determining the control terminal of the rectifier switch SWR to receive the control voltage VG or the fully-on voltage VF.

Figure 6:
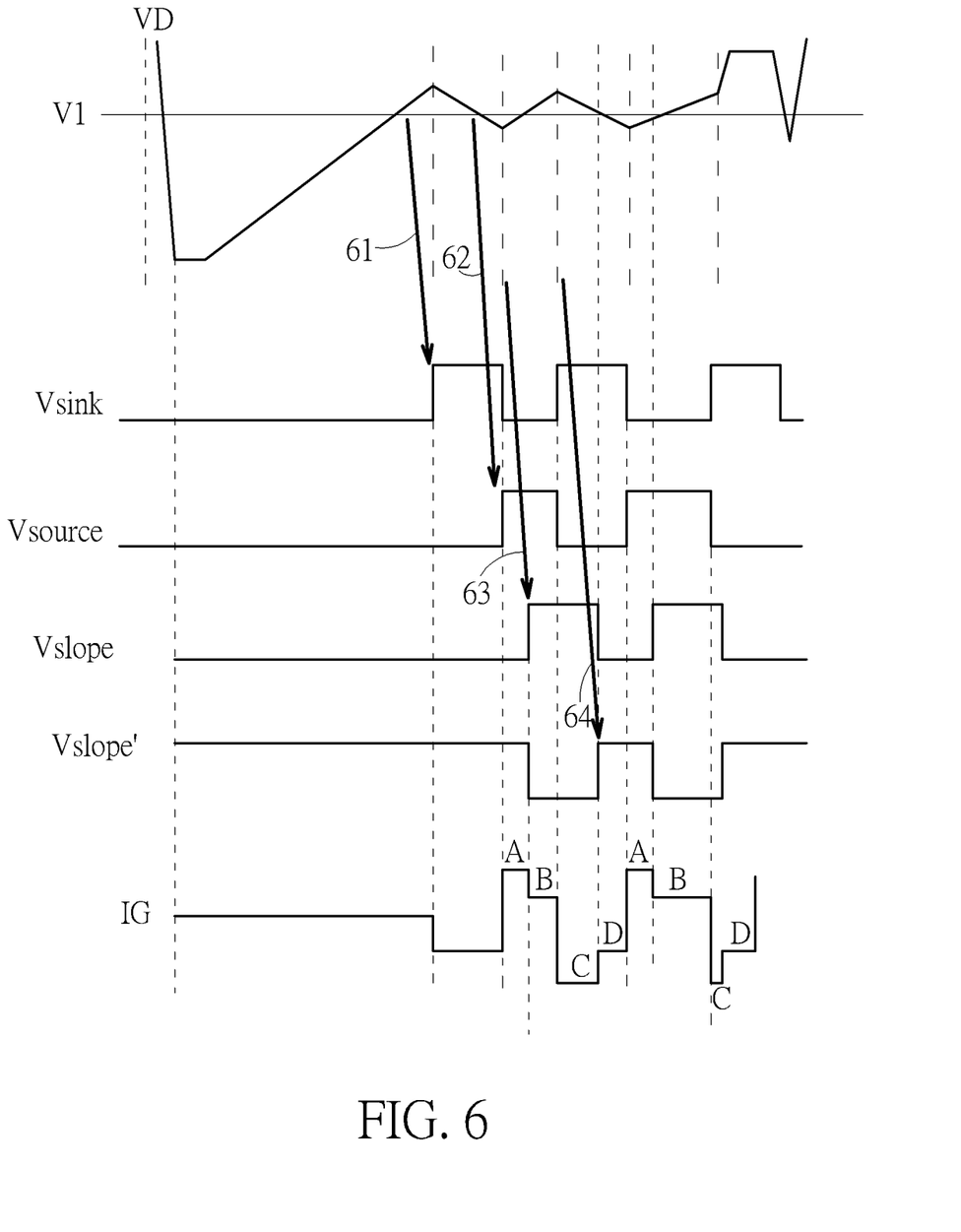
FIG. 6 illustrates waveforms of the signals of FIG. 5.

FIG. 6 illustrates waveforms of the signals of FIG. 5. FIG. 6 is an example, and embodiments are not limited thereto. As shown in FIG. 5 and FIG. 6, the main pull-up power supply 151 can be enabled by the inverted comparison result signal Vsource. The main pull-down power supply 152 can be enabled by the comparison result signal Vsink. The auxiliary pull-up power supply 153 can be enabled by the inverted waveform slope signal Vslope' and the inverted comparison result signal Vsource. The auxiliary pull-down power supply 154 can be enabled by the waveform slope signal Vslope and the comparison result signal Vsink.

An AND gate can be used when a power supply is enabled by two signals as mentioned above. For example, as shown in FIG. 5, the synchronous rectifier controller 100 can include an AND gate 550 and an AND gate 560. The AND gate 550 can receive the comparison result signal Vsink and the waveform slope signal Vslope to perform an AND operation to generate the signal Vsink2. The AND gate 560 can receive the inverted comparison result signal Vsource and the inverted waveform slope signal Vslope' to perform an AND operation to generate the signal Vsource2. Respectively, the signal Vsource2 and the signal Vsink2 can be used to control the auxiliary pull-up power supply 153 and the auxiliary pull-down power supply 154. When the signal Vsource2 has an enabling signal level, the auxiliary pull-up power supply 153 can be enabled. When the signal Vsink2 has an enabling signal level, the auxiliary pull-down power supply 154 can be enabled As shown in FIG. 5 and the phase A of FIG. 6, when the channel voltage VD is lower than the threshold voltage V1 (i.e. VD<V1), and the waveform of the channel voltage VD is falling, the auxiliary pull-up power supply 153 can be enabled by the inverted waveform slope signal Vslope' and the inverted comparison result signal Vsource.

As shown in FIG. 5 and the phase C of FIG. 6, when the channel voltage VD is higher than the threshold voltage V1 (i.e. VD>V1), and the waveform of the channel voltage VD is rising, the auxiliary pull-down power supply 154 can be enabled by the waveform slope signal Vslope and the comparison result signal Vsink.

In reality, there is a delay when the comparator 510 outputs its operation result. Hence, as shown by the arrow 61 of FIG. 6, the comparison result signal Vsink can change to the first logic value (e.g., a high value) a first delay time after the channel voltage VD becomes higher than the threshold voltage V1. As shown by the arrow 62 of FIG. 6, the comparison result signal Vsink can change to the second logic value (e.g., a low value) a second delay time after the channel voltage VD becomes lower than the threshold voltage V1.

In reality, there is a delay when the waveform slope detection circuit 530 outputs its operation result. Hence, as shown by the arrow 63 of FIG. 6, the waveform slope signal Vslope can change to the third logic value (e.g. a high value) a third delay time after the waveform of the channel voltage VD changes from falling to rising. As shown by the arrow 64 of FIG. 6, the waveform slope signal Vslope can change to the fourth logic value (e.g., a low value) a fourth delay time after the waveform of the channel voltage VD changes from rising to falling.

The current IG of FIG. 6 can flow though the output terminal Nout as shown in FIG. 5, and the current IG can be used to pull up or pull down the control voltage VG. As shown in FIG. 6, by controlling the main pull-up power supply 151, the main pull-down power supply 152, the auxiliary pull-up power supply 153 and the auxiliary pull-down power supply 154, the waveform of the current IG can have a phase A, a phase B, a phase C and a phase D as described below.

In the phase A, the main pull-up power supply 151 and the auxiliary pull-up power supply 153 are both enabled to provide a larger pull-up current. In the phase B, the main pull-up power supply 151 is enabled, and the auxiliary pull-up power supply 153 is not enable, so a smaller pull-up current is provided. In the phase C, the main pull-down power supply 152 and the auxiliary pull-down power supply 154 are both enabled to provide a larger pull-down current. In the phase D, the main pull-down power supply 152 is enabled, and the auxiliary pull-down power supply 154 is not enable, so a smaller pull-down current is provided. When the voltage regulator 110 performs voltage regulation according to the channel voltage VD, the phase A, the phase B, the phase C and the phase D can be repeated in sequence. According to the structure and signal waveforms of FIG. 5 and FIG. 6, in the phase A and the phase C, larger pull-up current and pull-down current can be respectively used to adjust the control voltage VG with a higher speed and a larger range. Relatively, in the phase B and the phase D, smaller pull-up current and pull-down current can be respectively used to adjust the control voltage VG with a lower speed and a higher accuracy. Hence, by arranging the enabling durations of the four power supplies, pull-up currents and pull-down currents with different magnitudes can be provided to pull up and pull down the control voltage VG more efficiently and accurately.

Figure 7:
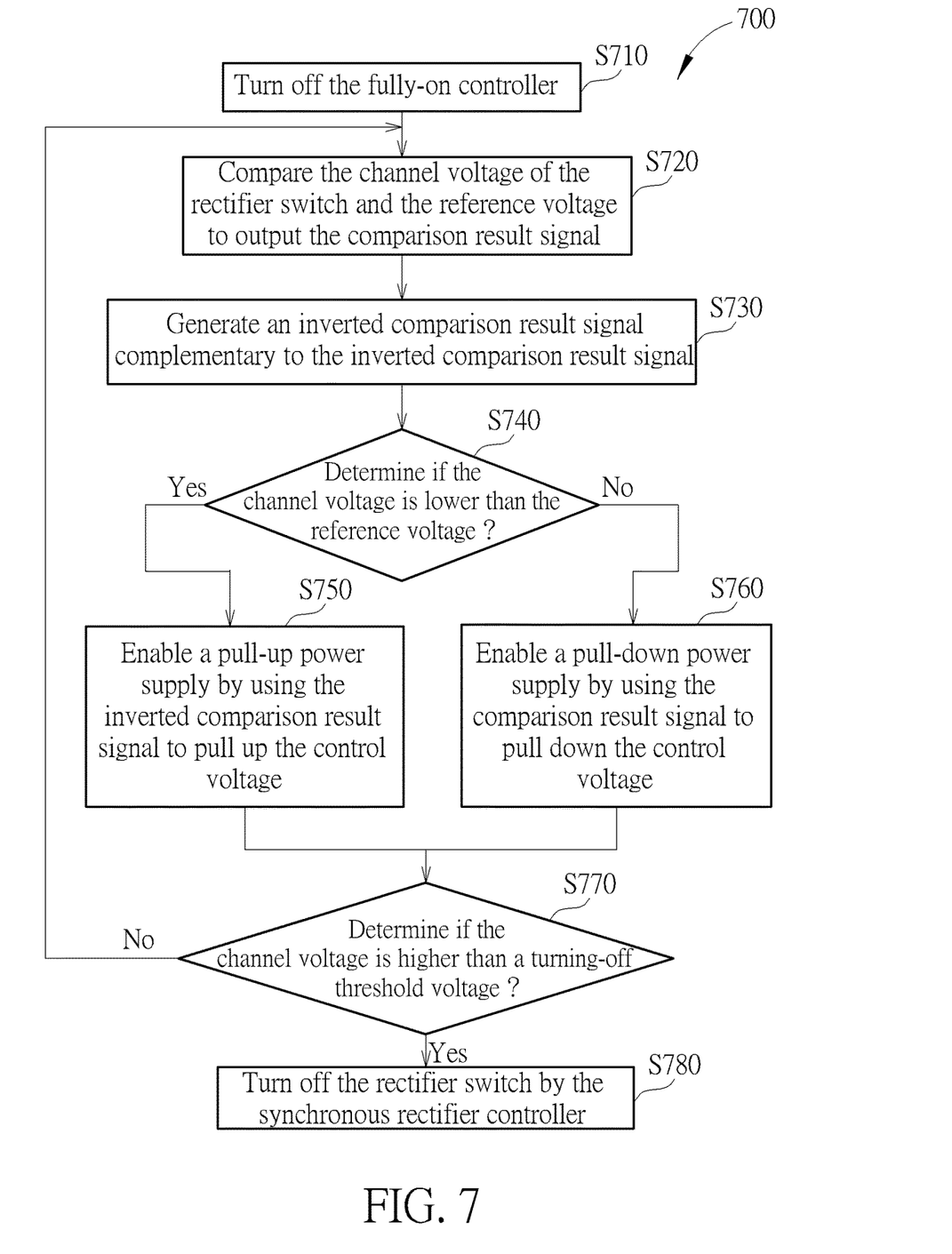
FIG. 7 illustrates a flowchart of a control method of FIG. 2 and FIG. 3.

FIG. 7 illustrates a flowchart of a control method 700 according to an embodiment. The control method 700 can be used to control the synchronous rectifier controller 100 of FIG. 2 and FIG. 3. The control method 700 can include the following steps.

Step S710: turn off the fully-on controller 120;
Step S720: compare the channel voltage VD of the rectifier switch SWR with the threshold voltage VR to output the comparison result signal OUT;
Step S730: generate an inverted comparison result signal OUTB according to the comparison result signal OUT, where the comparison result signal OUT can be complementary to the inverted comparison result signal OUTB;
Step S740: determine if the channel voltage VD is lower than the threshold voltage VR; if so, enter Step S750; otherwise, enter Step S760;
Step S750: enable a pull-up power supply Isource by using the inverted comparison result signal OUTB to pull up the control voltage VG, where the channel voltage VD can be lower than the threshold voltage VR, and the comparison result signal OUT can have a second logic value; enter Step S770;
Step S760: enable a pull-down power supply Isink by using the comparison result signal OUT to pull down the control voltage VG, where the channel voltage VD can be higher than the threshold voltage VR, and the comparison result signal OUT can have a first logic value;
Step S770: determine if the channel voltage VD is higher than a turning-off threshold voltage; if so, enter Step 780; otherwise, enter Step 720; and
Step S780: turn off the rectifier switch SWR by the synchronous rectifier controller 100.

In Step S710, the control voltage VG instead of the fully-on voltage VF can be selected to be the voltage VC of FIG. 2. The operations and principles of the Step S720 to Step S760 are described as above and are not repeated. In Step S770, as shown in FIG. 4, when the channel voltage VD of the rectifier switch SWR has not increased to be higher than the predetermined turning-off threshold voltage yet, Step S720 can be performed to keep performing voltage regulation to avoid turning off the rectifier switch SWR too early. When the channel voltage VD is higher than the turning-off threshold voltage, the synchronous rectifier controller 100 can adjust the control voltage VG to a predetermined value (e.g., a low voltage) to turn off the rectifier switch SWR.

Figure 8:
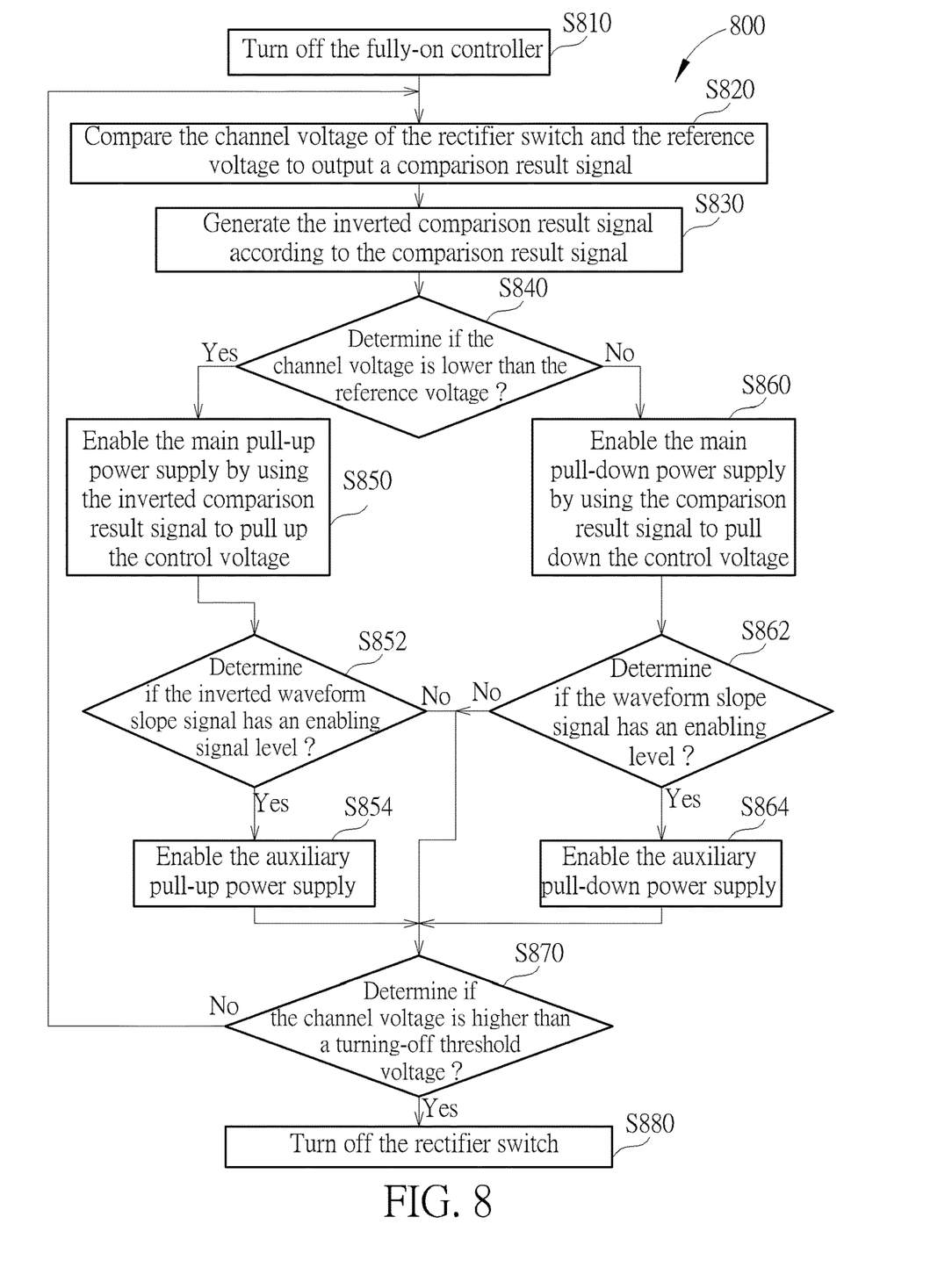
FIG. 8 illustrates a flowchart of a control method of FIG. 5.

FIG. 8 illustrates the control method 800 of the synchronous rectifier controller 100 according to another embodiment. The control method 800 can be used to control the synchronous rectifier controller 100 of FIG. 5. The control method 800 can include the following steps.

Step S810: turn off the fully-on controller 120;
Step S820: compare the channel voltage VD of the rectifier switch SWR with the threshold voltage V1 to output a comparison result signal Vsink;
Step S830: generate the inverted comparison result signal Vsource according to the comparison result signal Vsink;
Step S840: determine if the channel voltage VD is lower than the threshold voltage V1; If so, enter Step S850; otherwise, enter Step S860;
Step S850: enable the main pull-up power supply 151 by using the inverted comparison result signal Vsource to pull up the control voltage VG;
Step S852: determine if the inverted waveform slope signal Vslope' has an enabling signal level; If so, enter Step S854; otherwise, enter Step S870;
Step S854: enable the auxiliary pull-up power supply 153; enter Step S870;

Step S860: enable the main pull-down power supply 152 by using the comparison result signal Vsink to pull down the control voltage VG;

Step S862: determine if the waveform slope signal Vslope has an enabling level; if so, enter Step S864; otherwise, enter Step S870;

Step S864: enable the auxiliary pull-down power supply 154;

Step S870: determine if the channel voltage VD is higher than a turning-off threshold voltage; if so, enter Step 880; otherwise, enter Step 820; and Step S880: turn off the rectifier switch SWR by the synchronous rectifier controller 100.

In summary, by means of the synchronous rectifier controller 100, the control method 700 and the control method 800, the control voltage VG can be adjusted more accurately to avoid turning off the rectifier switch SWR too early. As a result, the operations and efficiency of the whole circuit of the primary side and the secondary side are improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A synchronous rectifier controller for controlling a rectifier switch, the rectifier switch comprising a control terminal, the synchronous rectifier controller comprising:
   a voltage regulator comprising an output terminal configured to provide a control voltage to the control terminal of the rectifier switch, the voltage regulator further comprising:
      a comparator configured to receive a channel voltage of the rectifier switch and compare the channel voltage with a threshold voltage to output a comparison result signal, wherein the comparison result signal has a first logic value when the channel voltage is higher than the threshold voltage, and the comparison result signal has a second logic value different from the first logic value when the channel voltage is lower than the threshold voltage;
      an inverter configured to receive the comparison result signal and invert the comparison result signal to generate an inverted comparison result signal complementary to the comparison result signal;
      a pull-up power supply coupled to the output terminal of the voltage regulator and configured to be enabled by the inverted comparison result signal to pull up the control voltage when the channel voltage is lower than the threshold voltage; and
      a pull-down power supply coupled to the output terminal of the voltage regulator and configured to be enabled by the comparison result signal to pull down the control voltage when the channel voltage is higher than the threshold voltage;
   wherein the pull-up power supply and the pull-down power supply are not enabled at the same time.

2. The synchronous rectifier controller of claim 1, further comprising:
   a fully-on controller configured to receive the channel voltage of the rectifier switch, and provide a fully-on voltage to the control terminal of the rectifier switch when the channel voltage meets a predetermined condition.

3. The synchronous rectifier controller of claim 2, further comprising:
   a switch configured to make the control terminal of the rectifier switch to selectively receive one of the fully-on voltage provided by the fully-on controller and the control voltage provided by the voltage regulator.

4. The synchronous rectifier controller of claim 1, wherein:
   the comparator compares the channel voltage with the threshold voltage, and outputs the comparison result signal after a delay time has elapsed;
   when the channel voltage is lower than the threshold voltage, the pull-up power supply is enabled to pull up the control voltage after the delay time has elapsed; and
   when the channel voltage is higher than the threshold voltage, the pull-down power supply is enabled to pull down the control voltage after the delay time has elapsed.

5. The synchronous rectifier controller of claim 1, wherein the voltage regulator further comprises:
   a waveform slope detection circuit configured to receive the channel voltage of the rectifier switch, and generate a waveform change slope value accordingly; and
   a power supply current modulation circuit configured to be controlled according to the waveform change slope value, control one of the pull-up power supply and the pull-down power supply to output a higher current to the output terminal of the voltage regulator when an absolute value of the waveform change slope value is smaller, and control one of the pull-up power supply and the pull-down power supply to output a lower current to the output terminal of the voltage regulator when the absolute value of the waveform change slope value is larger;
   wherein the higher currents are greater than the lower currents.

6. The synchronous rectifier controller of claim 5, wherein the waveform slope detection circuit comprises:
   a first resistor coupled between a first terminal of the waveform slope detection circuit and a node;
   a second resistor coupled between a second terminal of the waveform slope detection circuit and the node; and
   a capacitor coupled between a third terminal of the waveform slope detection circuit and the node;
   wherein an absolute value of a voltage of the node increases when a changing rate of the channel voltage increases, the voltage of the node is corresponding to the waveform change slope value, and the third terminal of the waveform slope detection circuit receives the channel voltage.

7. The synchronous rectifier controller of claim 5, wherein the power supply current modulation circuit further comprises:
   a first transistor comprising a first terminal coupled to a first reference voltage terminal, a second terminal coupled to a first terminal of the waveform slope detection circuit, and a control terminal coupled to the second terminal of the first transistor, wherein the second terminal of the first transistor outputs a first current to the first terminal of the waveform slope detection circuit; and
   a second transistor comprising a first terminal coupled to a second terminal of the waveform slope detection circuit, a second terminal coupled to a second reference voltage terminal, and a control terminal coupled to the first terminal of the second transistor, wherein the first terminal of the second transistor receives a second current from the second terminal of the waveform slope detection circuit.

8. The synchronous rectifier controller of claim 7, wherein the power supply current modulation circuit further comprises:
   a third transistor comprising a first terminal coupled to the first reference voltage terminal, a second terminal, and a control terminal coupled to the control terminal of the first transistor;
   a first current source coupled between the second terminal of the third transistor and the second reference voltage terminal, and configured to provide a first reference current;
   a fourth transistor comprising a first terminal coupled to the first reference voltage terminal, a second terminal coupled to the second terminal of the third transistor, and a control terminal coupled to the second terminal of the fourth transistor, wherein a third current flows to the first terminal of the fourth transistor; and
   a fifth transistor comprising a first terminal coupled to the first reference voltage terminal, a second terminal coupled to a switch of the pull-up power supply, and a control terminal coupled to the control terminal of the fourth transistor, wherein a fourth current flows to the switch of the pull-up power supply through the fifth transistor;
   wherein the third current is positively related to a difference between the first reference current and the first current, and the third current is positively related to the fourth current.

9. The synchronous rectifier controller of claim 7, wherein the power supply current modulation circuit further comprises:
   a second current source configured to provide a second reference current;
   a sixth transistor comprising a first terminal coupled to the second current source, a second terminal coupled to the second reference voltage terminal, and a control terminal coupled to the control terminal of the second transistor;
   a seventh transistor comprising a first terminal coupled to the first terminal of the sixth transistor, a second terminal coupled to the second reference voltage terminal, and a control terminal coupled to the first terminal of the seventh transistor, wherein a fifth current flows through the seventh transistor; and
   an eighth transistor comprising a first terminal coupled to a switch of the pull-down power supply, a second terminal coupled to the second reference voltage terminal, and a control terminal coupled to the control terminal of the seventh transistor, wherein a sixth current flows through the eighth transistor;
   wherein the fifth current is positively related to a difference between the second reference current and the second current, and the sixth current is positively related to the fifth current.

10. A synchronous rectifier controller for controlling a rectifier switch, the rectifier switch comprising a control terminal, the synchronous rectifier controller comprising:
   a voltage regulator comprising an output terminal configured to provide a control voltage to the control terminal of the rectifier switch, the voltage regulator further comprising:
      a comparator configured to receive a channel voltage of the rectifier switch and compare the channel voltage with a threshold voltage to output a comparison result signal, wherein the comparison result signal has a first logic value when the channel voltage is higher than the threshold voltage, and the comparison result signal has a second logic value different from the first logic value when the channel voltage is lower than the threshold voltage;
      a first inverter configured to receive the comparison result signal and invert the comparison result signal to generate an inverted comparison result signal complementary to the comparison result signal;
      a waveform slope detection circuit configured to receive the channel voltage of the rectifier switch, and generate a waveform slope signal accordingly, wherein the waveform slope signal has a third logic value when a waveform of the channel voltage is rising, and the waveform slope signal has a fourth logic value when the waveform of the channel voltage is falling;
      a second inverter configured to receive the waveform slope signal and invert the waveform slope signal to generate an inverted waveform slope signal complementary to the waveform slope signal;
      a main pull-up power supply coupled to the output terminal of the voltage regulator and configured to pull up the control voltage;
      a main pull-down power supply coupled to the output terminal of the voltage regulator and configured to pull down the control voltage;
      an auxiliary pull-up power supply coupled to the output terminal of the voltage regulator and configured to simultaneously pull up the control voltage with the main pull-up power supply; and
      an auxiliary pull-down power supply coupled to the output terminal of the voltage regulator and configured to simultaneously pull down the control voltage with the main pull-down power supply;
      wherein one of the comparison result signal and the inverted comparison result signal is used to enable the main pull-up power supply, the other one of the comparison result signal and the inverted comparison result signal is used to enable the main pull-down power supply, one of the waveform slope signal and the inverted waveform slope signal is used to enable the auxiliary pull-up power supply, and the other one of the waveform slope signal and the inverted waveform slope signal is used to enable the auxiliary pull-down power supply.

11. The synchronous rectifier controller of claim 10, wherein:
   the inverted comparison result signal is used to enable the main pull-up power supply;
   the comparison result signal is used to enable the main pull-down power supply;
   the inverted waveform slope signal and the inverted comparison result signal are both used to enable the auxiliary pull-up power supply; and
   the waveform slope signal and the comparison result signal are both used to enable the auxiliary pull-down power supply.

12. The synchronous rectifier controller of claim 11, wherein:
   when the channel voltage is lower than the threshold voltage and the waveform of the channel voltage is falling, the auxiliary pull-up power supply is enabled by the inverted waveform slope signal and the inverted comparison result signal; and when the channel voltage is higher than the threshold voltage and the waveform of the channel voltage is rising, the auxiliary pull-down power supply is enabled by the waveform slope signal and the comparison result signal.

13. The synchronous rectifier controller of claim 10, wherein the comparison result signal changes to the first logic value a first delay time after the channel voltage is higher than the threshold voltage, and the comparison result signal changes to the second logic value a second delay time after the channel voltage is lower than the threshold voltage.

14. The synchronous rectifier controller of claim 10, wherein the waveform slope signal changes to the third logic value a third delay time after the waveform of the channel voltage changes from falling to rising, and the waveform slope signal changes to the fourth logic value a fourth delay time after the waveform of the channel voltage changes from rising to falling.

15. A control method of a synchronous rectifier controller, the synchronous rectifier controller comprising a voltage regulator, the voltage regulator providing a control voltage to a control terminal of a rectifier switch to control the rectifier switch, the control method comprising:
comparing a channel voltage of the rectifier switch with a threshold voltage to output a comparison result signal, wherein the comparison result signal has a first logic value when the channel voltage is higher than the threshold voltage, and the comparison result signal has a second logic value different from the first logic value when the channel voltage is lower than the threshold voltage;
generating an inverted comparison result signal according to the comparison result signal, wherein the inverted comparison result signal is complementary to the comparison result signal;
enabling a pull-up power supply by using the inverted comparison result signal to pull up the control voltage when the channel voltage is lower than the threshold voltage; and
enabling a pull-down power supply by using the comparison result signal to pull down the control voltage when the channel voltage is higher than the threshold voltage.

16. The control method of claim 15, wherein:
the comparison result signal is outputted a delay time after the channel voltage and the threshold voltage are compared;
when the channel voltage is lower than the threshold voltage, the pull-up power supply is enabled to pull up the control voltage after the delay time has elapsed; and
when the channel voltage is higher than the threshold voltage, the pull-down power supply is enabled to pull down the control voltage after the delay time has elapsed.

17. The control method of claim 15, wherein the synchronous rectifier further comprises a fully-on controller, and the control method further comprises:
the fully-on controller providing a fully-on voltage to the control terminal of the rectifier switch when the channel voltage meets a predetermined condition.

18. The control method of claim 15, further comprising:
receiving the channel voltage of the rectifier switch to generate a waveform change slope value of the channel voltage;
controlling one of the pull-up power supply and the pull-down power supply to output a higher current to the output terminal of the voltage regulator when an absolute value of the waveform change slope value is smaller, and
controlling one of the pull-up power supply and the pull-down power supply to output a lower current to the output terminal of the voltage regulator when the absolute value of the waveform change slope value is larger;
wherein the higher currents are greater than the lower currents.

19. A control method of a synchronous rectifier controller, the synchronous rectifier controller comprising a voltage regulator, the voltage regulator providing a control voltage through an output terminal, the control voltage being provided to a control terminal of a rectifier switch to control the rectifier switch, the control method comprising:
comparing a channel voltage of the rectifier switch with a threshold voltage to output a comparison result signal, wherein the comparison result signal has a first logic value when the channel voltage is higher than the threshold voltage, and the comparison result signal has a second logic value different from the first logic value when the channel voltage is lower than the threshold voltage;
generating an inverted comparison result signal according to the comparison result signal, wherein the inverted comparison result signal is complementary to the comparison result signal;
outputting a waveform slope signal according to the channel voltage of the rectifier switch, wherein the waveform slope signal has a third logic value when a waveform of the channel voltage is rising, and the waveform slope signal has a fourth logic value when the waveform of the channel voltage is falling;
generating an inverted waveform slope signal according to the waveform slope signal, wherein the inverted waveform slope signal is complementary to the waveform slope signal;
selectively enabling a main pull-up power supply by using one of the comparison result signal and the inverted comparison result signal to pull up the control voltage, and selectively enabling a main pull-down power supply by using the other one of the comparison result signal and the inverted comparison result signal to pull down the control voltage; and
selectively enabling an auxiliary pull-up power supply by using one of the waveform slope signal and the inverted waveform slope signal to simultaneously pull up the control voltage with the main pull-up power supply, and selectively enabling an auxiliary pull-down power supply by using the other one of the waveform slope signal and the inverted waveform slope signal to simultaneously pull down the control voltage with the main pull-down power supply.

20. The control method of claim 19, further comprising:
enabling the auxiliary pull-up power supply by the inverted waveform slope signal and the inverted comparison result signal when the channel voltage is lower than the threshold voltage and the waveform of the channel voltage is falling; and
enabling the auxiliary pull-down power supply by the waveform slope signal and the comparison result signal when the channel voltage is higher than the threshold voltage and the waveform of the channel voltage is rising.

* * * * *